United States Patent [19]

Goldstein et al.

[11] 4,440,795

[45] Apr. 3, 1984

[54] PROCESS FOR THE PREPARATION OF A STABLE CITRUS FLAVORED MALT BEVERAGE

[75] Inventors: Henry Goldstein, Brookfield; Joseph T. Hoff, Hartland; Charles L. Cronan, Shorewood; Ch. S. Rao, Milwaukee, all of Wis.

[73] Assignee: Miller Brewing Company, Milwaukee, Wis.

[21] Appl. No.: 391,179

[22] Filed: Jun. 23, 1982

Related U.S. Application Data

[63] Continuation-in-part of Ser. No. 231,971, Feb. 6, 1981, abandoned.

[51] Int. Cl.³ ............................................. C12G 3/06
[52] U.S. Cl. .................................... 426/592; 426/490; 426/495
[58] Field of Search ................. 426/490, 495, 592, 11, 426/14, 16; 210/651, 640

[56] References Cited

U.S. PATENT DOCUMENTS

| | | | |
|---|---|---|---|
| 3,615,024 | 10/1971 | Michaels | 210/490 |
| 3,798,331 | 3/1974 | Bavisotto et al. | 426/592 X |
| 3,908,021 | 9/1975 | Rehberger et al. | 426/11 X |
| 3,988,486 | 10/1976 | Rhein | 426/495 |
| 4,001,458 | 1/1977 | Murolo | 426/592 |
| 4,021,580 | 5/1977 | Raymond et al. | 426/592 X |
| 4,089,778 | 5/1978 | Gauger | 210/651 X |
| 4,180,589 | 12/1979 | Checoye et al. | 426/11 |

FOREIGN PATENT DOCUMENTS

| | | | |
|---|---|---|---|
| 51-70891 | 6/1976 | Japan | 426/495 |
| 52-64495 | 5/1977 | Japan | 426/495 |
| 1045191 | 10/1966 | United Kingdom | 426/495 |
| 1447505 | 8/1976 | United Kingdom | |

OTHER PUBLICATIONS

Grossman's Guide to Wines, Beers and Spirits, 6th Ed., 1977, Charles Schribner's Sons: New York, pp. 274–279, 374–376, 409.
Reverse Osmosis/Deacidification of Liquids, Chemical Abstracts, vol. 77, 1972, 330922.
Partial Dealcoholization of Beer by Reverse Osmosis, Chemical Abstracts, vol. 86, 1977, 86:15164f.

Primary Examiner—Joseph M. Golian
Attorney, Agent, or Firm—Quarles & Brady

[57] ABSTRACT

A method of preparing a stable citrus flavored alcoholic malt beverage which does not form off aromas on storage comprises subjecting a feed or beer which contains components which can in the presence of citrus flavoring agents cause off aromas upon storage to reverse osmosis employing a membrane having a molecular weight cutoff of up to about 200 to remove substantial amounts of sulfur containing amino acids and other labile components which in the presence of citrus flavoring can cause off aromas, collecting the permeate which passes through said membrane and using it as the alcoholic base to which the citrus flavoring is added to obtain a stable citrus flavored alcoholic malt beverage.

3 Claims, No Drawings

PROCESS FOR THE PREPARATION OF A STABLE CITRUS FLAVORED MALT BEVERAGE

RELATED CASE

The present application is a continuation-in-part of our earlier co-pending patent application Ser. No. 231,971 filed Feb. 6, 1981, now abandoned.

FIELD OF THE INVENTION

The present invention relates to a process for the production of a stable flavored malt beverage and more particularly, to a method of preparing a stable flavored malt beverage by use of reverse osmosis.

There is a continuing interest in the marketing of flavored malt beverages which are prepared by adding a nontraditional beer flavor to a fermented alcoholic or beer base.

Flavored malt beverages have been marketed for many years in Europe. In Germany, a mixture of beer and concentrated raspberry juice is available; in France, a blend of beer and lemonade or limeade is popular; in England "shandy," a mixture of beer and lemonade or lime juice is available; and in Belgium, mixtures of beer and cherry juice and beer and grenadine syrup are available.

In the past, various attempts have been made to produce by fermentation processes neutral tasting beers or bland beers which could be used as bases to produce malt beverages having desired non-traditional beer flavors.

It has recently been discovered that such neutral or bland beers, which can be beers, ales, near beers or grain wines prepared by fermentation with yeast, contain components which upon storage will interact with added citrus flavoring agents, including citrus containing colas, to produce off aromas which have been described by taste panels as resembling "rotten fruit." The off aromas are more obvious when the flavored malt beverage has been stored at elevated temperatures which suggests that the off aromas are probably due to the presence of reactive heat labile components in the beer.

SUMMARY OF THE INVENTION

It is the primary object of the present invention to disclose a method of preparing an alcoholic beverage base for use in preparing stable citrus flavored malt beverages.

It is a further object of the present invention to disclose a novel alcoholic beverage base which is suitable for the preparation of storage stable citrus flavored malt beverages.

We have discovered that storage stable citrus flavored malt beverages can be prepared by a method which comprises first subjecting a beer, which has been prepared by the fermentation of grain with yeast, to reverse osmosis using a membrane which permits the water, alcohol and organics having a molecular weight of about less than 200, to pass therethrough and which retains substantially all the other original beer ingredients including most of the sulfur containing amino acids, and polypeptides which are believed to be the main components which cause the off aromas to develop during storage. The solution which passes through the membrane, the permeate, is collected and used as the alcoholic beverage base to which the citrus flavoring is added.

DESCRIPTION OF PREFERRED EMBODIMENT

In the preferred embodiment of the present invention, a neutral or bland beer is subjected to reverse osmosis using a cellulose acetate membrane having a molecular weight cut off of about 200 to obtain a permeate which is useful as an alcoholic beverage base. The permeate consists essentially of the water, alcohol and organics having a molecular weight of less than about 200, which are mostly volatiles, of the feed beer. The permeate contains substantially reduced amounts of sulfur containing amino acids as compared to the feed beer.

"Reverse osmosis," as used herein, describes membrane separation processes by which a solution containing a solute having molecular dimensions greater than or of about the same order of magnitude of the molecular dimensions of the solvent in which it is dissolved, is depleted of solute by being subjected to a pressure that forces the solvent to pass through a membrane whose physical and chemical properties result in leaving the solute to concentrate. The term "ultra filtration" is sometimes used to describe such pressure activated membrane separations which involve solutions of solutes of about 500 molecular weight and above, and the term "reverse osmosis" is sometimes used to refer to such membrane separation process wherein the molecules of the solute are of a size within one order of magnitude of those of the solvent.

Three terms are used repeatedly by those skilled in the art relating to pressure activated membrane separations. They are the following:

(a) "feed" which refers to the original solution or recycled concentrate;

(b) "permeate" which refers to the liquid including solvent which passes through the membrane; and (c) "concentrate" which refers to the liquid which remains behind and contains the concentrated solute.

The reverse osmosis process results in production of two liquid fractions, the "permeate" and the "concentrate." It is the "permeates" which are used to produce the citrus flavored malt beverages which are unexpectedly stable and do not produce off aromas even when stored at elevated temperatures.

Attempts to remove the reactive heat labile components of the base by other techniques have been unsuccessful. In addition, reverse osmosis has the advantages of speed of operation, mild operating conditions, and low operating costs compared to various other separation processes such as evaporation, dialysis, ultra centrifugation, ion exchange, chemical precipitation and the like. Such advantages are especially important where the material to be processed is biologically active or thermally unstable, or where relatively large volumes of solvent are present in the solution to be processed.

In the preferred practice of the present invention, the feed is a beer prepared by fermentation of a wort consisting of malt and a highly fermentable syrup adjunct. However, as previously indicated, the "feed" could be almost any alcoholic beverage obtained by the fermentation of grain such as near beer, ale, and grain wine. Alcoholic beverages prepared by the fermentation of grain with yeast usually contain water, alcohol, carbohydrates, proteins, protein fragments, amino acids, including sulfur containing amino acids, inorganics, sugars and volatiles. They also may contain added ingredients such as hops. The term "beer" as used herein is intended to include all such alcoholic beverages.

The preferred reverse osmosis membrane is a cellulose acetate membrane which is rated for pressures up to 400–450 psi. The reverse osmosis membrane need not be cellulose acetate, it could be one of the other commercially available membranes such as polysulfones, aromatic polyamides, nylon, as well as composite or grafted membranes of various configurations which effectively remove the labile components from the feed which interact with the flavors to form the off aromas.

In the preferred process, a cellulose acetate membrane is used with a pressure of less than 240 psi at ambient temperatures or less. However, commercial production would conceivably employ larger commercial reverse osmosis units with membranes capable of handling pressures of up to 800 psi or greater.

The preferred membranes are cellulose acetate membranes such as those available from Osmonics, Inc. of Hopkins, Minnesota under the trade symbol SEPA. The SEPA membranes are made of cellulose acetate polymer which has high stability between pH2 and pH8. The SEPA membranes are integrally bonded to a synthetic backing material which gives added strength and simplifies orientation of the membrane. SEPA membranes are anisotropic in nature and have a dense top skin with a porous support layer. An especially preferred membrane is SEPA-97 with a 94–97% NaCl rejection, a molecular weight cut-off of 200 for organics and 10 to 15 gal/day-ft$^2$ at 77° F. at 400 psig. The membrane has a nominal pore size of 5 Angstroms, a maximum operating pressure of 800 psig and a normal operating pressure of 400–450 psig. An example of a membrane which may be particularly adaptable for commercial high flow rates is an anisotropic high flux, low pressure poymeric membrane.

The practice of the invention may be further illustrated by the examples which follows:

EXAMPLE 1

Nineteen liters of beer having an ethyl alcohol content of 7.69% on a weight by weight basis and an extract content of 1.46% on the same basis were concentrated using a table top reverse osmosis unit made by Osmonics, Inc. of Hopkins, Minn. The table top unit employed a cellulose acetate membrane, SEPA-97, which was rated for pressures up to 400–450 psi. The unit was operated at between 3° and 4° C. using a pressure of 185 psi. From the 19 liters of beer which was used as a feed and the concentrate recycled through the membrane, 16.3 liters of permeate were obtained which contained 7.73% w/w ethanol and an extract content of 0.16% w/w.

Two citrus flavored beverages were produced. One employed the permeate as the alcoholic base and the other employed the beer feed. Each of the beverages had the following formula:

| Ingredients | ml |
| --- | --- |
| High Fructose Corn Syrup | 60 |
| 10% Citric Acid in Water | 22 |
| 15% Terpeneless Lemon Oil in Ethanol | 0.03 |
| 16% Sodium Benzoate in Water | 1 |
| Beer or Permeate | 400 |
| Deionized Water q/s/ad | 800 |

The resulting ethanol content were 3.84% w/w and 3.86% w/w for the flavored beverages made for the beer and the permeate, respectively. The beverages were then placed in a syphon and carbonated with one carbon dioxide charger per 800 ml. After equilibrating one hour at 42° F., the beverages were bottled in 12 oz. bottles and crowned. Samples of these beverages were stored for two weeks at three temperatures: 32°, 75° and 100° F., equilibrated at 42° F. and sensorially evaluated by a sensory panel consisting of eight members.

The beverage made with the beer was characterized for 32° F. storage as beery, fresh, citrus, spicy. For 75° F., the expected decrease in flavor intensity was noted and for 100° F. the beverage was characterized as having a "rotten fruit" like aroma, sulfury, and stale. In contrast, the beverage made with the permeate as the base was characterized for 32° F. storage was fresh, citrus, spicy, beery; for 75° F. and 100° F. the expected decrease in flavor intensity was again noted, but very little, if any, "rotten fruit" like or sulfury aromas were observed. Surprisingly, only one panelist noted a stale flavor.

EXAMPLE 2

A 23.5 liter sample of a commercial beer having an ethanol content of 5.25% w/w and extract content of 5.68% by weight were concentrated by reserve osmosis using the same equipment and conditions as in Example 1. The first 2 liters, middle 15 liters and last 2 liters of permeate were isolated for evaluating their relative stabilities when used to produce flavored beverages. Flavored beverages were made as in Example 1 adjusting the amount of deionized water to give a 3.80% w/w ethanol content in the final products. Samples were stored at 32° F. and 100° F. for two weeks. After equilibrating the samples at 42° F., a sensory panel of five people characterized all three samples stored at 32° F. as beery, fresh, citrus, and spicy. The three samples stored at 100° F. were noted to be very slightly staled, and to have a decreased flavor intensity, but to have no "rotten fruit" or sulfury aroma.

EXAMPLE 3

Fifty-seven liters of beer (identical to the beer in Example 2) were passed through the reverse osmosis unit one time rather than recycled as in Examples 1 and 2. Three liters of permeate were collected having an ethanol content of 5.23% w/w and 0.10% real extract content. Citrus flavored beverages were made and treated as in Example 2. A sensory panel of five people characterized the sample stored at 32° F. as beery, fresh, citrus and spicy. They characterized the sample stored at 100° F. as having a decreased flavor intensity but not as having a "rotten fruit" or sulfury aroma.

EXAMPLE 4

Fourteen liters of the permeate obtained in Example 1 were passed through a column (dia. = 2.5 cm) containing 85 g of activated carbon at a flow rate of 40 ml/min. A citrus flavored beverage was then produced and treated as in Example 1. A sensory panel of eight members characterized the 32° F. sample as fresh, spicy, and citrus. For 75° F. and 100° F. the expected decrease in flavor intensity was noted but little "rotten fruit" like or sulfury aroma was observed.

EXAMPLE 5

One liter portions of the three permeates of Example 2 were contacted with 2 g activated carbon with stirring for 30 minutes, stored at 32° F. for 4 days and the carbon separated from the permeate by filtration. Citrus flavored beverages were made with the filtrates as in Example 2 and treated as in Example 2. A sensory panel of five people characterized the three samples stored two weeks at 32° F. as fresh, citrus, and spicy, with little beer character while the three samples stored two weeks at 100° F. showed a decrease in flavor intensity with no "rotten fruit" like or sulfury aroma and very little staleness.

EXAMPLE 6

A 1.5 liter sample of permeate (Example 3) was treated with 3 g activated carbon as in Example 5. Citrus flavored beverages were made with the filtrate as in Example 2 and treated as in Example 2. A sensory panel of five people characterized the sample stored two weeks at 32° F. as fresh, citrus, and spicy with little beer character while the sample stored two weeks at 100° F. showed a decrease in flavor intensity, but no "rotten fruit" like or sulfury aroma and little staleness.

Although the exact mechanism by which our method using reverse osmosis is successful is not understood, there is evidence to support the conclusion that for effective removal of the undesirable components, the reverse osmosis membrane used should have a molecular weight cutoff of up to about 200.

EXPERIMENTS

In the experiment reported below the effectiveness of two membranes having different molecular weight cutoffs was compared. The object of the experiment was to study the effects of reverse osmosis membranes with different flow rates and molecular weight cutoffs on processing time, properties and shelf-life of a neutral beer base.

Two membranes, SEPA-92 and SEPA-97 (Osmonics, Inc., Hopkins, Minn.), were selected for this study. SEPA-92 was rated to have faster flow rate than SEPA-97. Both membranes were made of cellulose acetate polymer, and they have the following general specifications.

| Specification | RO membrane | |
|---|---|---|
| | SEPA-97 | SEPA-92 |
| 1. Pore size, Angstroms | 5 | 6 |
| 2. % NaCl rejection | 94–97 | 90–94 |
| 3. Mol. wt cutoff for organics | 200 | 300 |
| 4. Flow rate (l/hr) for pure water | 11 | 18 |

Reverse osmosis unit model #OSMO-1119-SS (Osmonics, Inc., Hopkins, Minn.) was used in this study. Ten liters of a specially brewed natural malt beverage feed were processed using SEPA-97 and the permeate collected. The procedure was repeated with SEPA-92. Two runs were made on each membrane. The flow rates of the permeate were calculated in liters per hour.

The permeates were carbon treated (Darco 12×20, granular, 8.5 gms/liter) and used as the alcoholic base for the preparation of beverages using a tonic formulation containing citrus flavoring. After storage for two weeks at 100° and 32° F., the samples of the beverages were evaluated by a test panel. The questionnaire included a 24 point scale and the stability of the 100° sample was rated by comparison to the 32° sample, which was considered as the reference and given a score of 1.

Samples of the beverages were analyzed for carbohydrates, alcohol, real extract, sulfhydryls and headspace volatiles.

RESULTS

Permeate Flow Rates. Although permeate flow rates (l/hr) for pure water (11 for SEPA-97 and 18 for SEPA-92) were much higher, calculated permeate flow rates for the neutral malt beverage were 1.913 for SEPA-97 and 2.315 for SEPA-92. These values represent an average of duplicate runs on each membrane.

Shelf-Life. A mean stability score of 4.06 for the SEPA-97 membrane and 9.56 for the SEPA-92 membrane were obtained, indicating that use of the SEPA-97 was more effective producing an alcoholic base which stayed fresh upon storage (high score is an indication of decreased stability of the product but it does not necessarily mean decreased acceptability).

Chemical Analyses. The permeate samples from SEPA-97 and SEPA-92 did not have any measurable quantity of carbohydrates (Table 1). The alcohol, real extract and sulfhydryl contents of the permeates were similar for both membranes (Table 2). This suggests that in addition to the sulfur-containing amino acids, the reverse osmosis membrane SEPA-97 is removing other components that have an adverse effect on stability in the presence of citrus flavoring. Although four neutral base samples came from the same lot, HSV data of these samples were considerably different (Table 3). HSV data of the permeates from the same membranes were also different (Table 3).

TABLE 1

Effect of SEPA-97 and SEPA-92 on Carbohydrate Content of Various Base Samples.

| Membrane | Run # | Sample | Component & Concentration, g/100 ml | | | | | |
|---|---|---|---|---|---|---|---|---|
| | | | N.F. | DP-3 | DP-2 | DP-1 | Fructose | Total |
| SEPA-97 | 1 | R.O. 48 - N.B. | 0.08 | 0.07 | — | 0.16 | 0.02 | 0.33 |
| | | R.O. 48 - Perm. | — | — | — | — | — | 0.00 |
| | | R.O. 48 - Conc. | 0.91 | 0.52 | 1.04 | 0.80 | 0.10 | 3.52 |
| | 2 | R.O. 49 - N.B. | 0.17 | 0.09 | 0.15 | 0.14 | tr | 0.56 |
| | | R.O. 49 - Perm. | — | — | — | — | — | 0.00 |
| | | R.O. 49 - Conc. | 0.80 | 0.48 | 1.00 | 0.84 | 0.10 | 3.31 |
| SEPA-92 | 1 | R.O. 50 - N.B. | 0.21 | 0.07 | 0.16 | 0.14 | — | 0.59 |
| | | R.O. 50 - Perm. | — | — | — | — | — | 0.00 |
| | | R.O. 50 - Conc. | 1.05 | 0.66 | 1.16 | 0.90 | 0.12 | 4.07 |
| | 2 | R.O. 51 - N B. | 0.09 | — | 0.07 | 0.13 | — | 0.31 |
| | | R.O. 51 - Perm. | — | — | — | — | — | 0.00 |
| | | R.O. 51 - Conc. | 1.01 | 0.63 | 1.16 | 0.90 | 0.11 | 3.98 |

TABLE 2

Effect of SEPA-97 and SEPA-92 on Alcohol, Real Extract and Sulfhydryl Content of Various Base Samples

| Membrane | Run # | Sample Description | Alcohol (% wt.) | Real Extract (% wt.) | Sulfhydryls (ppm) |
|---|---|---|---|---|---|
| SEPA-97 | 1 | R.O. 48 Neutral Base | 7.36 | 1.17 | 64.8 |
|  |  | R.O. 48 Permeate | 7.24 | 0.16 | 3.0 |
|  |  | R.O. 48 Concentrate | 7.17 | 5.21 | 315.0 |
|  | 2 | R.O. 49 Neutral Base | 5.99 | 1.24 | 65.4 |
|  |  | R.O. 49 Permeate | 7.39 | 0.10 | 0.1 |
|  |  | R.O. 49 Concentrate | 7.25 | 4.89 | 283.0 |
| SEPA-92 | 1 | R.O. 50 Neutral Base | 7.15 | 1.19 | 66.8 |
|  |  | R.O. 50 Permeate | 6.40 | 0.10 | 0.6 |
|  |  | R.O. 50 Concentrate | 6.66 | 5.59 | — |
|  | 2 | R.O. 51 Neutral Base | 7.50 | 1.17 | 66.0 |
|  |  | R.O. 51 Permeate | 7.53 | 0.16 | 2.3 |
|  |  | R.O. 51 Concentrate | 6.92 | 5.11 | 326.4 |

TABLE 3

Effect of SEPA-97 and SEPA-92 on Headspace Volatiles (HSV) of Various Base Samples.

|  | PERMEATE FROM SEPA-97 | | | | PERMEATE FROM SEPA-92 | | | |
|---|---|---|---|---|---|---|---|---|
|  | RUN 1 | | RUN 2 | | RUN 1 | | RUN 2 | |
| FLAME IONIZATION DETECTOR | | | | | | | | |
| Volatile | N. BASE | PERM | N. BASE | PERM | N. BASE | PERM | N. BASE | PERM |
| Acetaldehyde | 7.53 | 5.86 | 5.76 | 3.76 | 6.86 | 2.09 | 8.28 | 6.15 |
| N—Propanol | 6.64 | 6.95 | 6.36 | 7.43 | 9.17 | 9.12 | 9.61 | 7.93 |
| Ethyl Acetate | 36.80 | 43.82 | 42.45 | 1.70 | 19.84 | 2.60 | 44.73 | 30.65 |
| Isobutanol | 16.16 | 16.25 | 14.72 | 10.35 | 15.28 | 9.63 | 18.58 | 13.92 |
| Unknown 1 (RPA) | — | — | — | — | — | — | — | — |
| Isopropyl Acetate | — | — | — | — | — | — | — | — |
| Ethyl Propanoate | — | — | — | — | — | — | — | — |
| Active Amyl Alcohol | 24.29 | 23.53 | 21.26 | 18.60 | 26.28 | 17.40 | 26.24 | 22.10 |
| Isoamyl Alcohol | 73.22 | 71.45 | 65.23 | 56.21 | 78.40 | 55.24 | 80.30 | 66.35 |
| Isobutyl Acetate | 0.15 | 0.14 | 0.13 | — | — | — | 0.19 | — |
| Ethyl Butanoate | 0.28 | 0.33 | 0.26 | — | — | — | 0.30 | 0.22 |
| N—Butyl Acetate | — | — | — | — | — | — | — | — |
| Isoamyl Acetate | 2.49 | 2.67 | 2.76 | — | 1.05 | — | 3.10 | 1.51 |
| Total PPM | 167.4 | 170.9 | 158.9 | 98.1 | 156.9 | 96.1 | 191.3 | 148.80 |
| ELECTRON CAPTURE DETECTOR | | | | | | | | |
| Volatile | | | | | | | | |
| Diacetyl | 0.048 | 0.035 | 0.029 | 0.046 | 0.051 | 0.030 | 0.049 | 0.038 |
| 2,3-Pentanedione | 0.014 | 0.011 | 0.010 | 0.007 | 0.012 | 0.006 | 0.016 | 0.010 |
| Total VDK | 0.062 | 0.046 | 0.039 | 0.053 | 0.063 | 0.036 | 0.065 | 0.048 |

CONCLUSIONS

The permeate obtained using the SEPA 92 membrane was a better base for citrus flavored beverages than the beer feed. However, the results indicate that the SEPA-97 membrane, which has a molecular weight cut off of 200, is superior to the SEPA-92 membrane for the processing of a neutral malt beverage because the permeate obtained when using SEPA-97 is significantly more effective as an alcoholic base in the presence of citrus flavoring.

An additional experiment was conducted to investigate the performance of the SEPA-97 reverse osmosis membrane. In the experiment, the chemical variation of permeate collected from five Reverse Osmosis trials was examined. All trials were taken to 88% of initial volume. Initial volumes of a neutral beer, which had been prepared by the fermentation of malt and a highly fermentable sugar adjunct, were 18.6 liters for R.O.3, 9.0 liters for R.O. 14 and 15.0 liters for R.O.15, 16, and 17.

The chemical analysis from these trials (Table 4) indicated (except in R.O.3) a slight decrease in permeate alcohol content and a complete removal of carbohydrate. Permeate sulfhydral and real extract were consistently low. Total headspace volatiles (except for R.O.3) were reduced approximately 20 ppm from their initial concentrations in the neutral base.

TABLE 4

Analyses of Neutral Bases and Resulting Permeates from Various Reverse Osmosis Trials

| | Alcohol (% wt) | Real Extract (% wt) | Carbohydrates (g/100 ml) | Sulfhydrals (ppm) | Headspace Volatiles (ppm) |
|---|---|---|---|---|---|
| Neutral Bases | | | | | |
| R.O. 3 (PB 1460-1465) | 7.69 | 1.46 | 1.06 | 90 | 198.0 |
| R.O. 14 (PB 1478-1480) | 7.04 | 1.29 | 0.74 | 62 | 190.5 |
| R.O. 15 (PB 1478-1480) | 7.16 | 1.17 | 0.78 | 64 | 200.4 |
| R.O. 16 (PB 1478-1480) | 7.36 | 1.20 | 0.72 | 62 | 196.8 |
| R.O. 17 (PB 1499-1501) | 7.29 | 1.20 | 0.74 | 60 | 211.4 |
| Permeates | | | | | |
| R.O. 3 | 7.73 | 0.16 | Trace | 3 | 192.0 |
| R.O. 14 | 6.74 | 0.15 | 0 | 4 | 165.4 |
| R.O. 15 | 6.93 | 0.15 | 0 | 3 | 180.0 |
| R.O. 16 | 6.68 | 0.16 | 0 | 2 | 182.9 |
| R.O. 17 | 6.81 | 0.16 | 0 | 2 | 191.2 |

In Table 5, the results of analysis of the ethanol, real extract, carbohydrates, bitterness sulfhydryl (SH) and volatiles content of a bland beer feed and a permeate obtained using the SEPA-97 membrane are recorded. The results indicate that the total volatile and ethanol content are not greatly effected by the reverse osmosis treatment but that the total real extract, carbohydrate and SH levels are substantially reduced.

TABLE 5

| Feed Beer Bland Base | Concentration in mg/L | |
|---|---|---|
| | Feed | Permeate |
| Acetaldehyde | 8.36 | 6.14 |
| R—Propanol | 11.2 | 10.5 |
| Ethyl Acetate | 33.4 | 36.9 |
| Isobutanol | 18.7 | 16.4 |
| Ethyl Propanoate | 0.25 | — |
| Active Amyl Alcohol | 22.5 | 19.9 |
| Isoamyl Alcohol | 98.0 | 87.1 |
| Isobutyl Acetate | 0.14 | 0.13 |
| Ethyl Butanoate | 0.23 | 0.26 |
| R—Butyl Acetate | 0.19 | 0.16 |
| Isoamyl Acetate | 2.66 | 2.80 |
| Total Alcohols | 150.5 | 133.9 |
| Total Esters | 36.8 | 40.3 |
| Total Volatiles | 195.7 | 180.3 |
| Vicinal Diketones | 7.38 | 7.39 |
| Ethanol (%) | 7.38 | 7.39 |
| Real Extract (%) | 1.25 | 0.10 |
| Carbohydrate (%) | 1.00 | 0.01 |
| SH (mg/L) | 90 | 2 |

Amino acid analyses were completed on untreated and treated base samples. Table 6 tabulates the amino acid conttent in micromoles/milliliter of the samples labelled as follows: (1) Untreated Base Code 1, and (2) Treated Base Code 2.

The table gives concentrations of amino acids present in the concentrated samples. Values have not been adjusted for concentration factors.

Because cystine and glutamine were not included in the calibration standard, these amino acids were not quantitated in the samples; however, glutamine was present in both samples and cystine was present in the untreated base sample. Ethanolamine coeluted with an unidentified ninhydrin positive substance in the untreated base, and therefore was also not quantitiated.

TABLE 6

Amino Acid Content (in μmole/ml) of Untreated vs. Treated Base

| | Untreated Base | Treated Base |
|---|---|---|
| Phosphoserine | 0.26 | 0.07 |
| Threonine | 0.14 | 0.04 |
| Serine | 0.23 | 0.08 |
| Asparagine | 0.38 | 0.07 |
| Aspartic Acid | 0.05 | 0.00 |
| Glutamic Acid | 0.39 | 0.12 |
| Proline | 7.76 | 4.50 |
| Glycine | 0.52 | 0.13 |
| Alanine | 0.78 | 0.21 |
| Valine | 0.18 | 0.04 |
| Cystine | + | — |
| Methionine | 0.07 | 0.01 |
| Cystathionine | 0.08 | 0.02 |
| Isoleucine | 0.11 | 0.02 |
| Leucine | 0.39 | 0.09 |
| Tyrosine | 0.15 | 0.05 |
| Phenylalanine | 0.19 | 0.04 |
| γ-aminobutric Acid | 0.45 | 0.03 |
| Tryptophan | 0.18 | 0.01 |
| Ethanolamine | c | 2.32 |
| Ornithine | 0.06 | 0.01 |
| Lysine | 0.28 | 0.06 |
| Histidine | 0.16 | 0.04 |
| Arginine | 0.39 | 0.10 |
| Glutamine | + | + |

+ = present in sample
− = not present in sample
c = coeluted with other ninhydrin positive substance As can be seen from Table 6, the treated base contains substantially less of the sulfur containing amino acids, cystine, methionine and cystathionine, which are suspected of causing the off aromas with citrus flavoring than does the untreated beer feed.

It will be apparent to those skilled in the art that the method of the invention can be used with a variety of alcoholic feeds to obtain permeates which can be used as bases to prepare more stable flavored alcoholic beverages. Therefore, the invention is not to be limited except by the claims which follow:

We claim:

1. A method of preparing a stable citrus flavored alcoholic malt beverage, said method comprising selecting as the feed a beer prepared by the fermentation of grain, said beer comprising water, alcohol, carbohydrates, proteins, amino acids, including sulphur containing amino acids, inorganics, sugars and volatiles, subjecting said beer to reverse osmosis employing a membrane which has a molecular weight cutoff of up to about 200 for organics and a nominal pore size of about 5 Angstroms, then collecting the permeate which consists essentially of water, alcohol, and the organics having molecular weight of up to about 200 which are mostly the volatiles which are responsible for the beer flavor and aroma, and adding citrus flavoring to said permeate.

2. The method of claim 1 in which the membrane is a cellulose acetate membrane.

3. The product produced by the process of claim 1.

* * * * *